United States Patent
Kramer

[11] 3,721,986
[45] March 20, 1973

[54] RANGE MEASURING SYSTEM

[75] Inventor: Stanley I. Kramer, Brightwaters, N.Y.

[73] Assignee: Fairchild Industries, Inc., Germantown, Md.

[22] Filed: April 21, 1960

[21] Appl. No.: 23,849

[52] U.S. Cl........343/112 R, 343/100 CL, 343/112 D
[51] Int. Cl..............................................G01s 11/00
[58] Field of Search...........................343/100.7, 112

[56] References Cited

UNITED STATES PATENTS

| | | | |
|---|---|---|---|
| 2,837,738 | 6/1958 | VanValkenburgh | 343/112 |
| 2,971,190 | 2/1961 | Businges | 343/112 |

*Primary Examiner*—Benjamin A. Borchelt
*Assistant Examiner*—Richard E. Berger
*Attorney*—Michael W. York

EXEMPLARY CLAIM

1. In a system for determining the range between two objects, one of the objects radiating electromagnetic wave energy having distinguishable characteristics which arrives at the other object by way of a direct path and a reflected path wherein it is reflected off of a surface, an apparatus comprising a direct channel and a reflected channel, both said direct and said reflected channels receiving direct and reflected waves by way of the two paths, variable means responsive to one of said direct and reflected channels for making the direct wave on said direct channel substantially equal in amplitude to the direct wave on said reflected channel, subtracting means responsive to said variable means and to the other of said channels which provides an output representative of the difference between the direct wave on said direct channel and the direct wave on said reflected channel, and correlator means responsive to said subtracting means and to said direct channel for providing a signal representative of the amplitude of said output, the signal from said correlator means being connected to actuate said variable means.

7 Claims, 5 Drawing Figures

RANGE MEASURING SYSTEM

This invention relates to a range measuring system and, more particularly, to a passive system for measuring the range between a detecting aircraft and a target aircraft that is transmitting electromagnetic wave energy having distinguishable characteristics.

Range measuring systems for determining the distance between two objects, such as a target aircraft and a detecting aircraft, are generally described in the U.S. Pat. to van Valkenburgh No. 2,837,738. In the system to which that patent is directed, a detecting aircraft receives electromagnetic wave energy as it arrives from a target aircraft by way of two paths, a direct path and a reflected path wherein the waves are reflected from the terrain. With a knowledge of the angle of elevation of the target aircraft, the altitude of the detecting aircraft, and the time interval between the arrival of the waves via the two paths, the detecting aircraft is able to determine the location of the target aircraft.

In a preferred embodiment of the van Valkenburgh system, two receiving antennae are used, one for the direct waves and one for the reflected waves. However, it has been found in practice that the direct wave antenna also picks up the reflected waves and the reflected wave antenna also picks up the direct waves. This causes some difficulty when ranging on signals that are continuous and completely random in character, such as radar jamming noise signals, as distinguished from radar signals, for example, which are periodic pulses. Another system for ranging on this type of signal is described in U.S. copending application Ser. No. 3979, filed Feb. 1, 1960, in the name of Stanley I. Kramer, now abandoned. Whereas pulses are easily taken into account in a system of this sort, the presence of two noise signals on a single channel causes difficulty because they combine, with the consequence that excessive and complicated apparatus has been required to obtain an accurate time interval measurement.

Accordingly, it is a purpose of this invention to provide an apparatus for eliminating an undesired noise signal appearing on a channel. Since this apparatus is preferably used with airborne systems, it is especially important because it permits a substantial reduction in the weight and size of these systems.

This purpose is attained by providing an apparatus for a ranging system that has a direct channel and a reflected channel, both the direct and the reflected channels receiving direct and reflected waves from a radiating object, the apparatus including variable means responsive to the direct channel for making the direct signal on the direct channel substantially equal to the direct signal on the reflected channel, means responsive to the direct and the reflected channels for subtracting the direct signal on the direct channel from the direct signal on the reflected channel, and correlator means responsive to the subtracting means and to the direct channel which provides a signal representative of the amplitude of the difference between the direct signal on the direct channel and the direct signal on the reflected channel, the signal from the correlator means being connected to actuate the variable means.

This invention can be more completely understood from the following detailed description taken in conjunction with the accompanying figures of the drawings in which.

Figure 1:
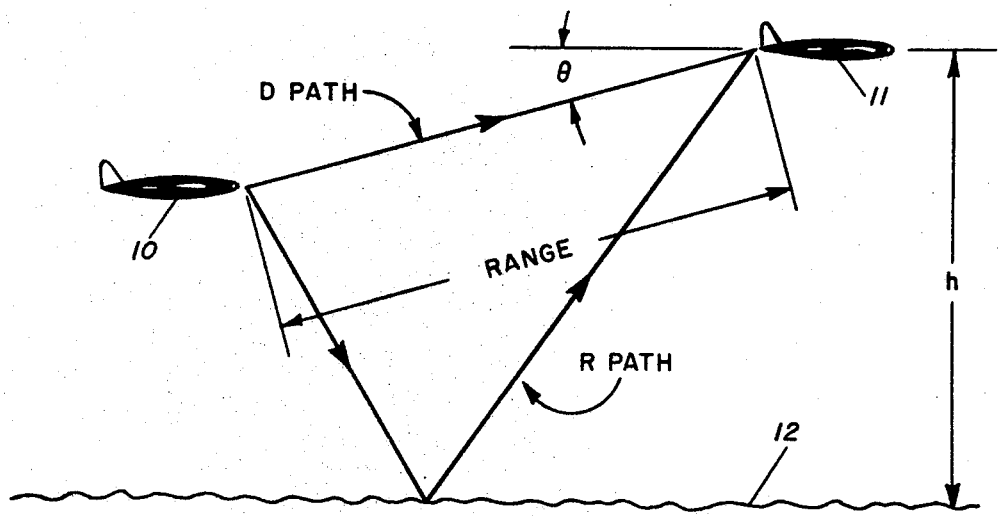
FIG. 1 is a diagram illustrating the relative positions of a target aircraft, a detecting aircraft, and a terrain.

FIG. 1 illustrates the relations existing between a target aircraft 10, a detecting aircraft 11 and a terrain 12. As explained in the aforementioned patent to van Valkenburgh and the copending U.S. Kramer patent application, the range between the target aircraft 10 and the detecting aircraft 11 can be determined by measuring the angle of elevation $\theta$ between the two aircraft, the altitude $h$ of the detecting aircraft above the terrain 12, and the time interval $\Delta t$ between the arrival at the detecting aircraft of electromagnetic wave energy from the target aircraft by way of a reflected R path and a direct D path. These quantities are inserted into a computer designed to solve the equation $$[4h^2 - (\Delta t\, V_p)^2]/[2\Delta t\, V_p - 4h \sin \theta]$$

for range, where $V_p$ is the velocity of propagation of the electromagnetic waves. A system constructed in accordance with the invention for determining these quantities and the range is illustrated in FIG. 2, this system being especially suited for determining the range when the target aircraft 10 is emitting electromagnetic radar jamming noise signals.

Figure 2:
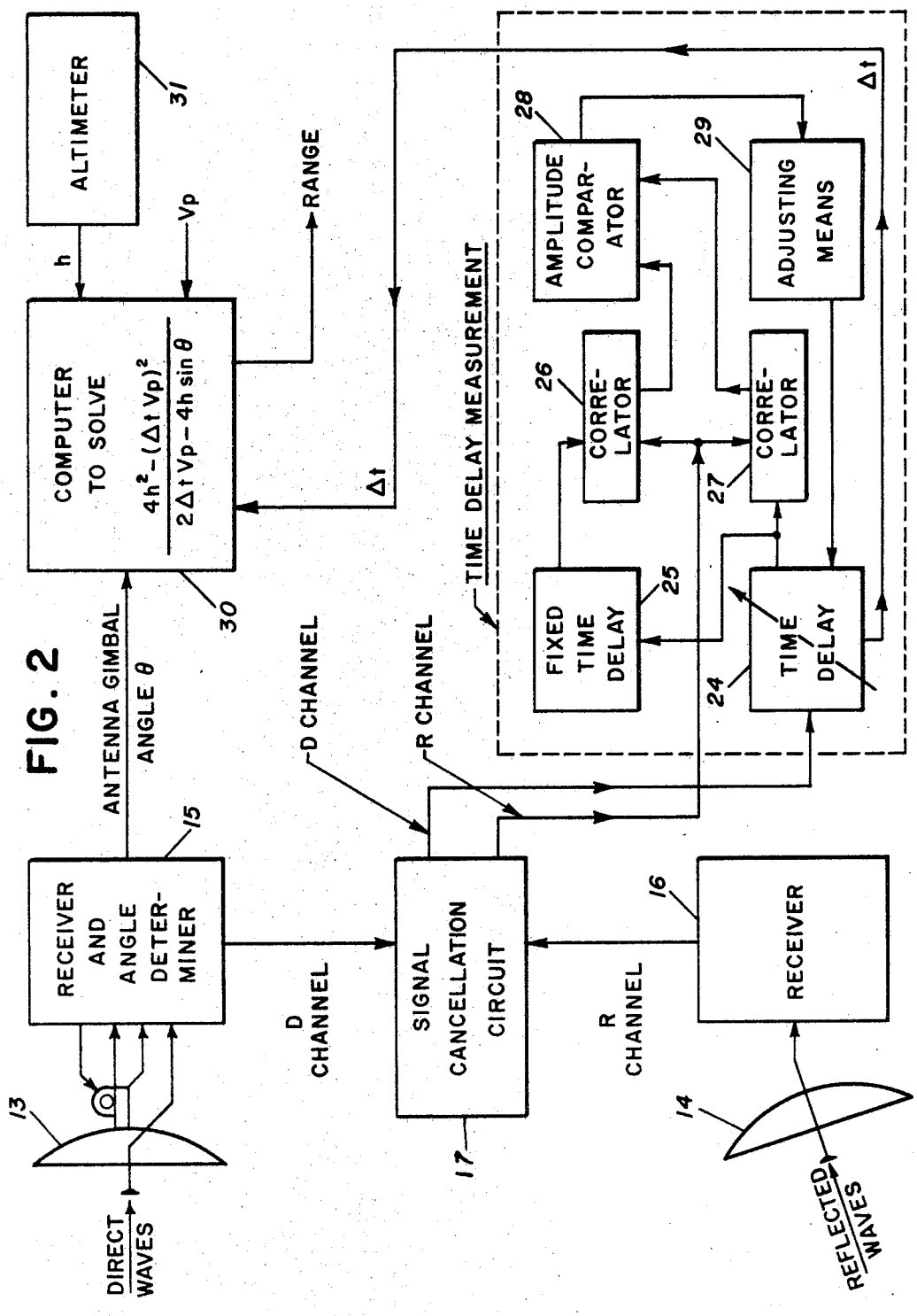
FIG. 2 is a block diagram of a passive range measuring system constructed in accordance with the invention.

With reference to FIG. 2, there is illustrated a system that is mounted in the detecting aircraft 11 which includes an antenna 13 that is normally aimed at the target aircraft 10 to receive primarily the direct waves, and an antenna 14 that is tilted downwardly to receive primarily the waves after they have been reflected from the terrain. The antenna 13 is preferably of the type commonly used in tracking radars, known as a conically scanning antenna. While this antenna 13 is designed to be highly directional, so that the angle of elevation $\theta$ can be determined, the antenna 14 is conventionally designed to have a broad receiving pattern.

The antennae 13 and 14 are connected to a receiver and angle determiner 15 and a receiver 16, respectively, which may be similar to those shown in the aforementioned patent to van Valkenburgh. The receiver and angle determiner 15 aims the antenna 13 at the target aircraft 10, provides a signal representative of the angle of elevation $\theta$, and provides a signal on a D channel representative of the amplitude of the waves picked up by the antenna 13. The receiver 16 provides a signal on an R channel representative of the amplitude of the waves picked up by the antenna 14.

Figure 5:
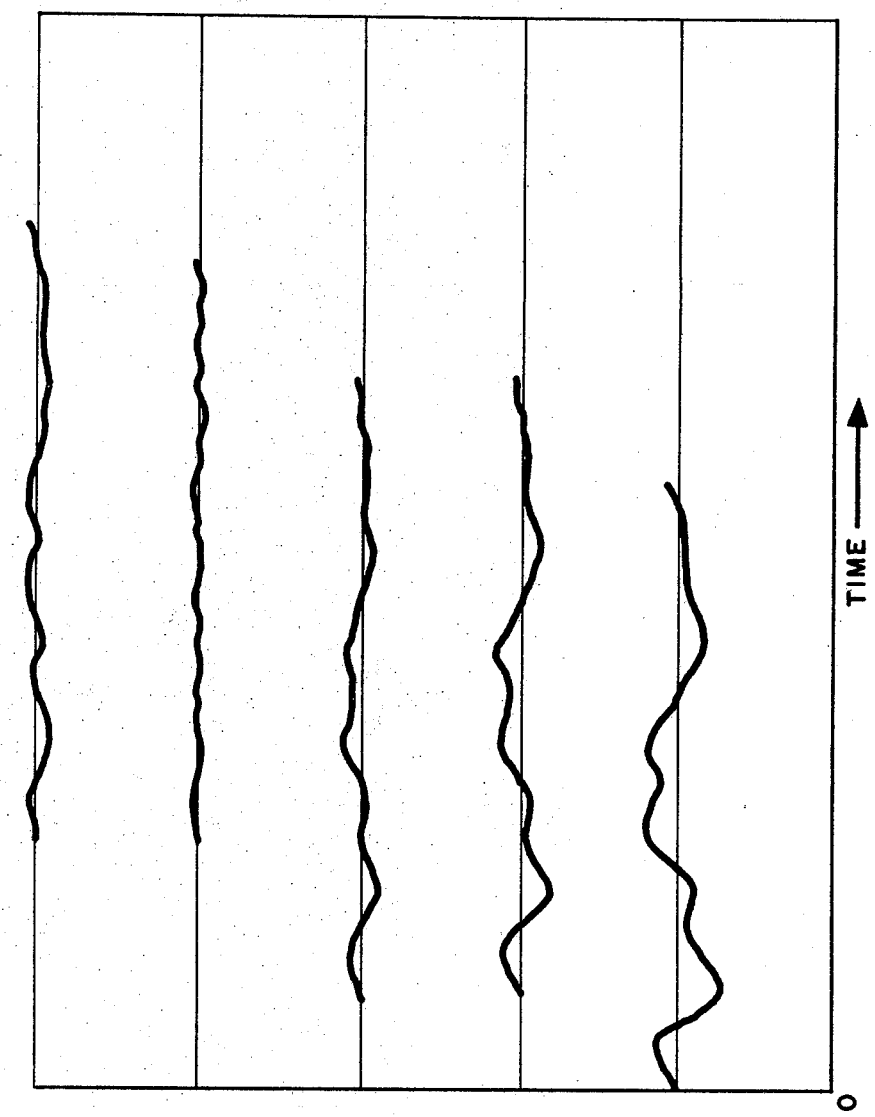
FIG. 5 is a schedule of waveforms illustrating the operation of the system.

With reference to the waveforms shown in FIG. 5 and the diagrams of FIGS. 1 and 2, assume that the target aircraft 10 transmits a radar jamming noise wave having the configuration illustrated by the waveform designated as the transmitted wave. A short time after this wave is transmitted, it is received by the antennae 13 and 14 as it arrives along the D path and a signal represented by the waveform $D_d$ appears on the D channel and a signal represented by the waveform $D_r$ appears on the R channel. While these two waveforms have the same configuration, the waveform $D_d$ is larger than the waveform $D_r$ because the antenna 13 is aimed at the target aircraft and has a narrow pattern, while the antenna 14 has a broad pattern and is directed generally at the terrain.

After a short time interval $\Delta t$, a second wave arrives at the detecting aircraft by way of the R path, which again is picked up by both the antenna 13 and the antenna 14. The waveform $R_d$, FIG. 5, represents the signal appearing on the D channel due to this reflected wave, and the waveform $R_r$ represents the signal appearing on the R channel. The waveform $R_d$ is very small and is assumed in the following discussion to be equal to zero; the waveform $R_r$ has substantially the same configuration as the waveforms $D_d$ and $D_r$ but is somewhat smaller in amplitude.

As previously explained, it is necessary to measure the time interval $\Delta t$ between the waveforms $D_d$ and $R_r$ before the range between the two aircraft can be determined. It can be seen that the waveform $D_r$ appearing on the R channel will add to the waveform $R_r$, making this time interval measurement difficult. It is the purpose of the signal cancellation circuit 17 shown in FIG. 2 and in detail in FIG. 3 to eliminate as completely as possible the waveform $D_r$ from the R channel.

Figure 3:
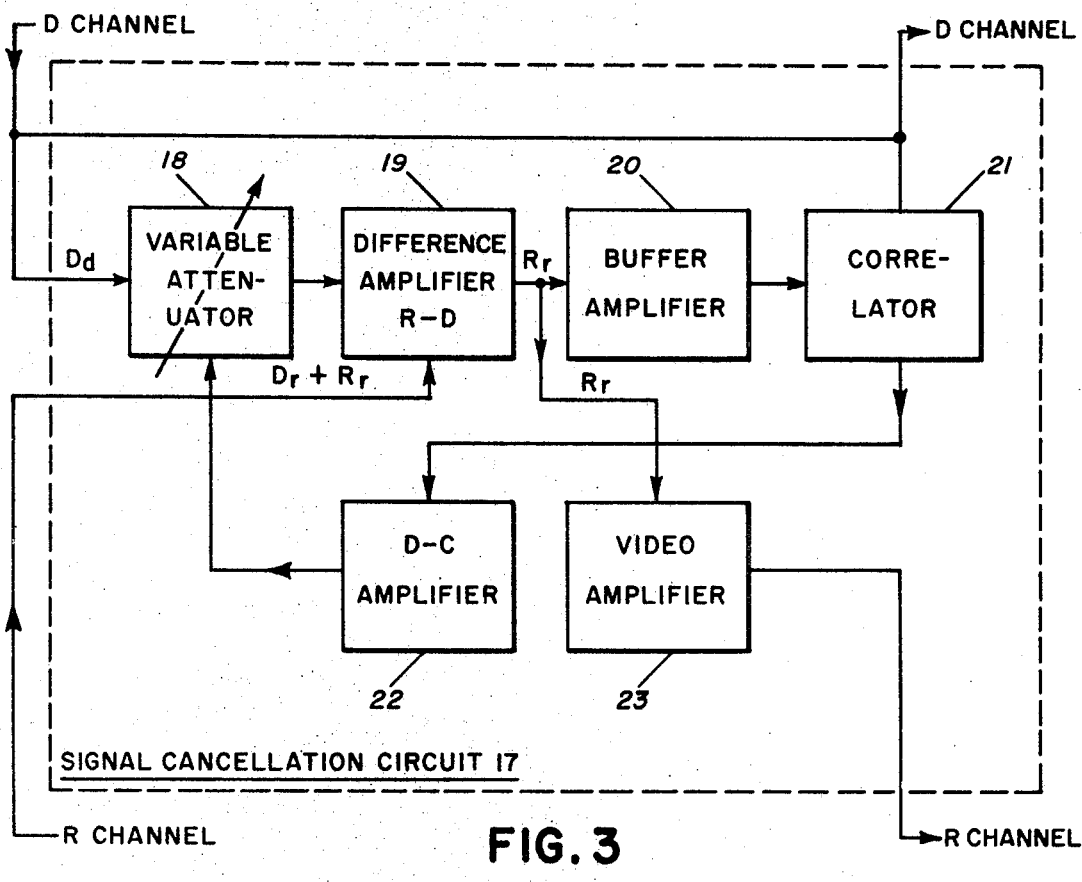
FIG. 3 is a block diagram of a portion of the system shown in FIG. 2.

One form of the signal cancellation circuit 17 is illustrated in detail in FIG. 3, and includes a variable attenuator circuit 18 connected to the D channel. The output of this variable attenuator 18 and the R channel are fed into a difference amplifier 19 that produces an output signal representative of the difference between the signals appearing on the R and D channels. The signal on the D channel consists essentially of the waveform $D_d$ and the signal on the R channel consists of the sum of the waveforms $D_r$ and $R_r$. It can be seen that if the signal appearing on the D channel input to the amplifier 19 is made equal to the $D_r$ component of the signal appearing on the R channel, the output of the amplifier 19 will be equal to the $R_r$ component because the $D_r$ component will have been eliminated.

Assuming that the $D_r$ component is substantially but not entirely eliminated, the output of the difference amplifier 19 will be equal to the waveform $R_r$ plus the uneliminated portion of the waveform $D_r$. This signal is fed into a buffer amplifier 20 which amplifies it before feeding it into a correlator circuit 21 that is responsive to this amplified signal and the $D_d$ waveform appearing on the D channel. This correlator circuit may consist of simply a multiplier circuit that is connected to the input of an integrating or averaging circuit. This circuit multiplies the uneliminated portion of the $D_r$ waveform by the $D_d$ waveform, and, because they are in time coincidence, the output of the multiplier circuit will always be positive and the output of the integrating circuit will have a substantial value if there is a portion of the $D_r$ waveform remaining. This correlator circuit, however, will not produce an output due to the $D_d$ and the $R_r$ waveforms because they are out of time coincidence and are noise signals which are completely random in character. Over a substantial length of time, the positive portion of the output from the multiplier circuit due to the $D_d$ and $R_r$ waveforms will equal its negative portion with the result that this output cancels out in the averager circuit. It can be seen, therefore, that the output of the correlator circuit 21 is indicative of the amplitude of the uneliminated portion of the $D_r$ waveform.

This output from the correlator circuit 21 is amplified by a D-C amplifier circuit 22 which is connected to the variable attenuator 18 in such a manner as to either increase or decrease the attenuation produced to the point where the $D_d$ waveform is exactly equal to the $D_r$ waveform. At this point, these two waveforms cancel each other out in the difference amplifier circuit 19 so that the output of the amplifier circuit 19 is equal to the waveform $R_r$ and the output of the correlator circuit 21 is equal to zero. The R channel output is taken from the output from the difference amplifier circuit 19, fed into a video amplifier circuit 23, and connected to the time delay measurement circuit shown in FIG. 2 along with the D channel output which is taken directly from the receiver 15 output.

In the remaining description it will be assumed that the cancellation is complete so that the signal appearing on the R channel at the input to the time delay measurement circuit consists solely of the waveform $R_r$ and the signal appearing on the D channel consists essentially of the waveform $D_d$. While the D channel also contains the waveform $R_d$, it is extremely small and is considered as being equal to zero.

The operation of this time delay measurement circuit is described in detail in the previously mentioned copending Kramer U.S. patent application, and, briefly, includes a variable time delay circuit 24 that is connected to the D channel, a fixed time delay circuit 25 that is connected to the variable time delay circuit 24, two correlator circuits 26 and 27, the correlator circuit 26 being connected to the fixed time delay circuit 25 and the R channel and the correlator circuit 27 being connected to the variable time delay circuit 24 and the R channel. An amplitude comparator circuit 28 is responsive to the two correlator circuits 26 and 27 and feeds an adjusting means 29 that adjusts the amount of time delay produced by the variable time delay circuit 24.

In operation, the correlator circuit 27, which may be identical with the correlator circuits 26 and 21, multiplies the reflected signal $R_r$ and the delayed direct signal $D_d$ and integrates or averages the multiplied value. Since the two input signals are noise signals, the output over a substantial period of time has a maximum value when the two input signals are in time coincidence, and has a zero value when the two input signals are substantially out of time coincidence. The correlator circuit 26 operates similarly but produces an output having a slightly different amplitude because the fixed time delay circuit 25 further delays the direct signal a small amount. This changes the degree of time coincidence between the direct and reflected signals. The comparator 28 provides a signal that is equal to zero when the outputs of the correlators 26 and 27 are equal which happens when the D channel inputs to the correlators 26 and 27 are equal out of time coincidence with the R channel inputs. When there is an unbalance the comparator provides either a plus or a minus signal that is representative of the degree of unbalance. The two correlator circuits, therefore, provide a polarity sense for the amplitude comparator and the adjusting means 29 so that the time delay circuit 24 will be adjusted in the proper direction.

The output signal from the time delay measurement circuit is taken from the variable time delay 24 and is determined by the amount of time delay necessary to put the reflected and the direct signals substantially in time coincidence. This output signal, representative of the time interval $\Delta t$ between the arrival of the direct and reflected signals, is fed into a computer 30 along with the antenna gimbal angle $\theta$ received from the receiver and angle determiner 15. Also fed into the computer 30 are signals representative of the altitude h of the detecting aircraft 11, derived from an altimeter 31 placed in the detecting aircraft, and the velocity of propagation $V_p$ of the electromagnetic waves. This computer is adapted to solve the equation $$\text{RANGE} = [4h^2 - (\Delta t\, V_p)^2]/[2\, \Delta t\, V_p - 4h \sin \theta]$$

for the range between the target aircraft 10 and the detecting aircraft 11. It should be understood that the signal inputs and outputs for this computer can be in the form of an electric potential, the amount of turn on a shaft, etc.

Figure 4:
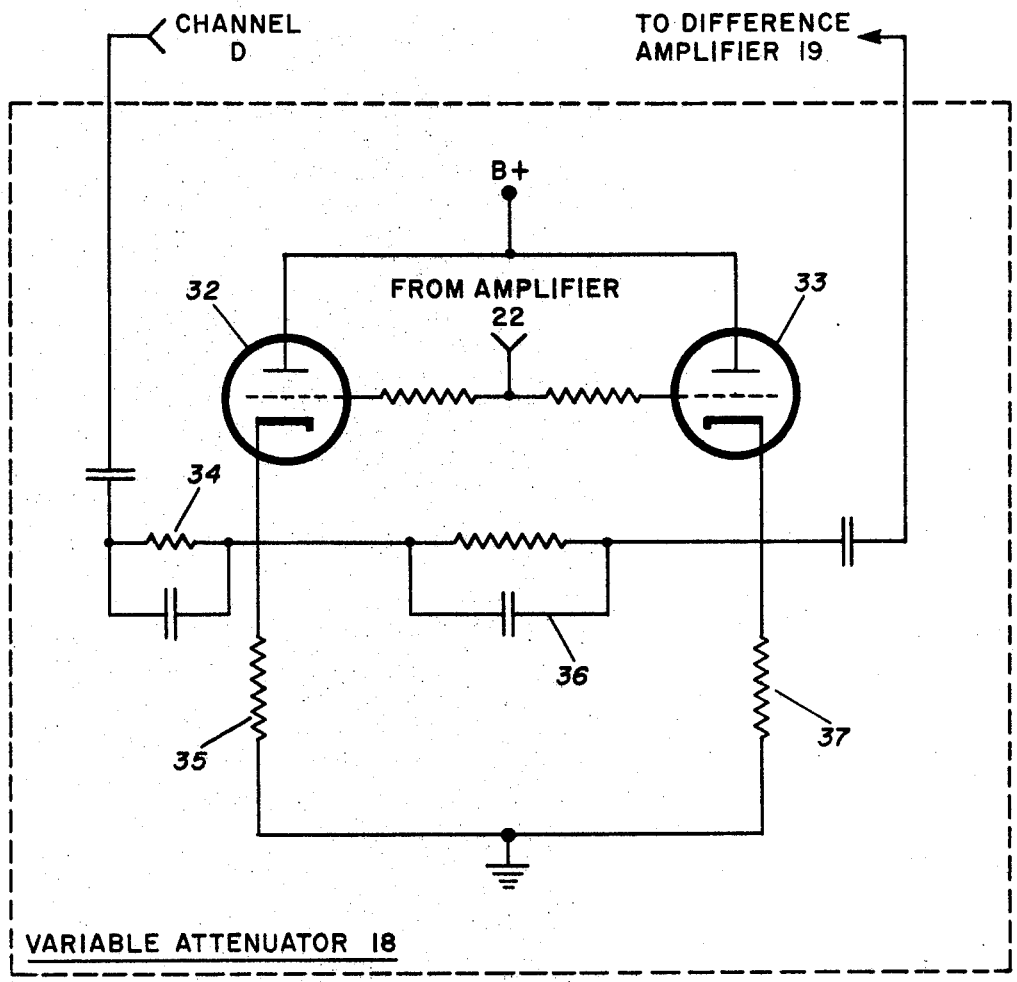
FIG. 4 is a schematic diagram of a portion of the block diagram shown in FIG. 3.

All of the individual components used in the system described can be circuits well known to those skilled in the art. Although various variable attenuators can be used, the variable electronic attenuator shown in FIG. 4 has been found to be particularly well suited. This circuit includes two stages 32 and 33 connected in cathode-follower type circuits, with the D channel input being connected through an impedance 34 to the cathode of stage 32. The cathode of this stage is also connected to a cathode resistor 35 and to the cathode of stage 33 through an impedance 36. The cathode of this last stage is also connected to a cathode resistor 37.

Since, for a cathode-follower circuit, the cathode voltage varies almost directly with the grid voltage, and since the cathode resistor is fixed, the plate and the cathode current for each stage are nearly proportional to the grid voltage. The combination of the cathode impedances, which for cathode-follower circuits is approximately equal to $1/gm$ where $gm$ is the mutual transconductance, and the cathode resistors 35 and 37 shunt the series input impedances 34 and 36 for these two stages. Since the mutual transconductance $gm$ is roughly proportional to the plate current, the cathode impedance can be made to vary with the plate current. In order to vary the plate current, the input signal from the amplifier 22 is applied to the control grids of the two stages. If the cathode impedances are made small relative to the cathode resistors 35 and 37, the cathode impedances can be made to have a controlling effect over most of the range. The output from the variable attenuator is taken off of the cathode of the second stage 33 and connected through a coupling capacitor to the difference amplifier 19 shown in FIG. 3.

As an example of another apparatus for making the direct signal on the R channel equal to the direct signal on the D channel, the variable attenuator 18 can be replaced by a fixed gain amplifier in the R channel and a variable gain amplifier in the D channel with its gain control connected to the D-C amplifier 22. Then, if the signals appearing on both channels are amplified but the signal on the D channel is not amplified as much as the signal on the R channel, the signals at the input to the difference amplifier 19 will be substantially equal and will cancel each other out.

An example of still another apparatus for this purpose includes a variable gain amplifier connected to the D channel. In these two alternative examples, means may be provided for taking into account the amplification of the reflected signal on the R channel so that the direct and the reflected signals on the two channels maintain their relative magnitudes.

The correlator circuits shown in FIGS. 2 and 3 may each be a simple multiplier circuit followed by a conventional integrating or averaging circuit as described in the previously mentioned Kramer U.S. application Ser. No. 3979. The buffer amplifier circuit 20 may be a conventional R-C coupled amplifier circuit, and the other components are all conventional and well known to those skilled in the art.

From the foregoing, it is apparent that a passive range measuring system has been provided having novel means for cancelling undesired signals out of its input channels. Through the use of the apparatus described herein, a substantial improvement in the performance of the range measuring system described in the previously mentioned U.S. Pat. to van Valkenburgh No. 2,837,738 and the pending patent application of Kramer Ser. No. 3979 is achieved. The elimination of these undesirable signals increases the accuracy of these systems and results in a substantial savings in the size, weight and complexity of the remainder of the range measuring system.

While representative embodiments of the present invention have been shown and described for purposes of illustration, it is apparent that the embodiment is susceptible of change and modification without departing from this invention in its broader aspects. Therefore, the invention described herein is not to be construed as limited to the specific embodiments described, but is intended to encompass all modifications thereof coming within the scope of the following claims.

I claim:

1. In a system for determining the range between two objects, one of the objects radiating electromagnetic wave energy having distinguishable characteristics which arrives at the other object by way of a direct path and a reflected path wherein it is reflected off of a surface, an apparatus comprising a direct channel and a reflected channel, both said direct and said reflected channels receiving direct and reflected waves by way of the two paths, variable means responsive to one of said direct and reflected channels for making the direct wave on said direct channel substantially equal in amplitude to the direct wave on said reflected channel, subtracting means responsive to said variable means and to the other of said channels which provides an output representative of the difference between the direct wave on said direct channel and the direct wave on said reflected channel, and correlator means responsive to said subtracting means and to said direct channel for providing a signal representative of the amplitude of said output, the signal from said correlator means being connected to actuate said variable means.

2. In a system for determining the range between two objects, one of the objects radiating electromagnetic wave energy having distinguishable characteristics which arrives at the other object by way of a direct path and a reflected path wherein it is reflected off of a surface, an apparatus comprising a direct channel and a reflected channel, both said direct and reflected channels receiving direct and reflected waves by way of the two paths, variable means responsive to one of said direct and reflected channels for making the direct wave on said direct channel substantially equal in amplitude to the direct wave on said reflected channel, subtracting means responsive to said variable means and to the other of said channels which provides an output representative of the difference between the direct wave on said direct channel and the direct wave on said reflected channel and also representative of the reflected wave on said reflected channel, and correlator means responsive to said subtracting means and said direct channel for providing a signal representative of the amplitude of said first output, the signal from said correlator means being connected to actuate said variable means and said second output being connected to means for determining the range between the two objects.

3. In a system for determining the range between two objects, one of the objects radiating electromagnetic wave energy having distinguishable characteristics which arrives at the other object by way of a direct path and a reflected path wherein it is reflected off of a surface, an apparatus comprising a direct channel and a reflected channel, both said direct and said reflected channels receiving direct and reflected waves by way of said two paths, variable means responsive to said direct channel for making the direct signal on said direct channel substantially equal in amplitude to the direct signal on said reflected channel, subtracting means responsive to said reflected channel and said variable means which provides an output representative of the difference in amplitude between its two inputs and correlator means responsive to said subtracting means and to said direct channel for providing an output representative of the amplitude of the difference between the direct signal on said direct channel and the direct signal on said reflected channel, said output from said correlator means being connected to actuate said variable means.

4. In a system for measuring the range between two objects having an apparatus of the type described in claim 3 wherein said variable means responsive to said direct channel comprises a variable attenuator.

5. A passive system for measuring the range between a first point and a second point at an unknown location from which detectable electromagnetic radiations having distinguishable characteristics are emanating, comprising first and second receiving means at the first point for receiving direct radiations and indirect radiations from the second point which have been reflected from a reflecting surface, a direct channel and a reflected channel responsive to said first and second receiving means, respectively, both the direct and reflected radiations appearing as signals on said direct and reflected channels, variable means responsive to said direct channel for making the direct signal on said direct channel substantially equal in amplitude to the direct signal on said reflected channel, subtracting means responsive to said variable means and said reflected channel for subtracting the direct signal on said direct channel at the output from said variable means from the signals on said reflected channel, correlator means responsive to said subtracting means and to said direct channel for providing an output representative of the difference in amplitude between the direct signal on said direct channel at the output from said variable means and the direct signal on said reflected channel, said output from said correlator means being connected to actuate said variable means, time delay measurement means responsive to the direct signal on said direct channel and to the reflected signal on said reflected channel taken from the output of said subtracting means for measuring the time interval between the arrival at the first point of the radiations from the second point by way of the direct and reflected paths, means for determining the angle of elevation of the second point relative to the first point, means for determining the altitude of the first point relative to the reflecting surface, and computer means for determining the range between the first and second points as a function of the time interval, the angle of elevation, the altitude of the first point, and the velocity of propagation of the radiations.

6. A passive system of the type described in claim 5 wherein said variable means comprises a variable attenuator.

7. A passive system of the type described in claim 6 wherein said variable attenuator is electronic and comprises first and second electron tubes each having at least cathode, control grid, and plate elements, said direct channel being connected through a first impedance to said cathode element of said first electron tube, said cathode element of said first electron tube being connected through a second impedance to said cathode element of said second electron tube, third and fourth impedances connected to said cathodes of said first and second electron tubes, said control grids of said first and second electron tubes being responsive to said output from said correlator means, and the output from said variable attenuator being taken off of said cathode element of said second electron tube.

* * * * *